(12) United States Patent
Aoki

(10) Patent No.: US 11,895,443 B2
(45) Date of Patent: Feb. 6, 2024

(54) PROJECTOR HAVING ADJUSTMENT CIRCUIT AND METHOD OF CONTROLLING PROJECTOR

(71) Applicant: SEIKO EPSON CORPORATION, Tokyo (JP)

(72) Inventor: Toru Aoki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/848,541

(22) Filed: Jun. 24, 2022

(65) Prior Publication Data

US 2022/0417476 A1 Dec. 29, 2022

(30) Foreign Application Priority Data

Jun. 25, 2021 (JP) .................................. 2021-105497

(51) Int. Cl.
*G09G 3/36* (2006.01)
*H04N 9/31* (2006.01)

(52) U.S. Cl.
CPC .......... *H04N 9/3135* (2013.01); *H04N 9/312* (2013.01); *H04N 9/3132* (2013.01)

(58) Field of Classification Search
CPC ................. H04N 9/312; H04N 9/3132; G09G 2320/02–0295; G09G 2320/06–106; G09G 3/18; G09G 3/2003; G09G 3/3406–3426; G09G 3/36–3696

See application file for complete search history.

(56) References Cited

U.S. PATENT DOCUMENTS

| | | | | |
|---|---|---|---|---|
| 2005/0200619 A1* | 9/2005 | Adachi | ................ | G09G 3/3648 345/204 |
| 2006/0125748 A1* | 6/2006 | Yang | .................... | G09G 3/3648 345/88 |
| 2008/0111835 A1* | 5/2008 | Hu | ........................ | G09G 3/3611 345/690 |
| 2009/0140965 A1* | 6/2009 | Ishiguchi | ............. | G09G 3/3648 345/87 |
| 2010/0164996 A1* | 7/2010 | Tomizawa | ........... | G09G 3/3648 345/213 |

(Continued)

FOREIGN PATENT DOCUMENTS

JP   H04-063332 A   2/1992
JP   2018-128486 A   8/2018

*Primary Examiner* — Sanghyuk Park
(74) *Attorney, Agent, or Firm* — Oliff PLC

(57) ABSTRACT

A projector includes: an electro-optical panel including a plurality of pixels; an optical-path shift element configured to change an optical path of light emitted from the plurality of pixels; and an image processing circuit configured to, in a unit period, supply an image signal to the plurality of pixels in an order, the unit period being included in one frame period for displaying an image of one frame indicated by an input image signal, the image signal corresponding to the plurality of pixels and being generated on a basis of the input image signal, in which the image processing circuit includes an adjustment circuit configured to adjust a response velocity of the plurality of pixels when the image displayed by the electro-optical panel is switched, on a basis of an order of supply of the image signal or of a position of a pixel at the electro-optical panel.

3 Claims, 7 Drawing Sheets

(56) References Cited

U.S. PATENT DOCUMENTS

2013/0050170 A1* 2/2013 Kimoto .................. G09G 3/003
  345/87
2016/0366383 A1* 12/2016 Nishimori ............ H04N 9/3188
2017/0092217 A1* 3/2017 Mizuno ................ G09G 3/3685

* cited by examiner

PROJECTOR HAVING ADJUSTMENT CIRCUIT AND METHOD OF CONTROLLING PROJECTOR

The present application is based on, and claims priority from JP Application Serial Number 2021-105497, filed on Jun. 25, 2021, the disclosure of which is hereby incorporated by reference herein in its entirety.

BACKGROUND

1. Technical Field

The present disclosure relates to a projector and a method of controlling the projector.

2. Related Art

In the technical fields of projectors, there is a method of increasing, in a pseudo manner, the resolution of an image that a user visually recognizes. Such a method includes a pixel shift technique using an optical-path shift element configured to optically shift the display position (for example, JP-A-04-063332). In the pixel shift technique, one frame period corresponding to one frame is divided into a plurality of unit periods, and the optical-path shift element is controlled so as to make the state of the optical-path shift element differ from each other for each unit period. With this configuration, the display positions of an image projected onto the projection surface from a projector are shifted for each unit period.

In the pixel shift technique, it is desirable that the state of the optical-path shift element be changed instantly from unit period to unit period and the projection image be switched instantly. However, in reality, a certain amount of time is required to change the states of the optical-path shift element and switch the projection image. Thus, in a case of the existing method of controlling a projector, a time lag happens between a period of time from the start of a change of the state of the optical-path shift element until the end of this change and a period of time from the start of a switch of the projection image until the end this switch. This may lead to a deterioration in the quality of the image that a user visually recognizes.

SUMMARY

A projector according to one aspect of the present disclosure includes an electro-optical panel including a plurality of pixels arrayed therein and configured to emit light from the plurality of pixels to display an image, an optical-path shift element configured to change an optical path of light emitted from the plurality of pixels, an image processing circuit configured to, in each of a plurality of unit periods, supply an image signal to the plurality of pixels in a predetermined order, the plurality of unit periods being included in one frame period for displaying one frame of an image indicated by an input image signal, the image signal corresponding to the plurality of pixels and being generated on a basis of the input image signal, in which the image processing circuit includes an adjustment circuit configured to adjust a response velocity of the plurality of pixels when the image displayed by the electro-optical panel is switched, on a basis of an order of supply of the image signal or of a position of a pixel at the electro-optical panel.

In addition, a method of controlling a projector according no one aspect of the present disclosure includes controlling a projector including an electro-optical panel including a plurality of pixels arrayed therein and configured to emit light from the plurality of pixels to display an image, and an optical-path shift element configured to change an optical path of light emitted from the plurality of pixels. The method includes supplying an image signal no the plurality of pixels in a predetermined order in each of a plurality of unit periods, the plurality of unit periods being included in one frame period for displaying one frame of an image indicated by an input image signal, the image signal being generated on a basis of the input image signal, the image signal corresponding to the plurality of pixels, and the method also including adjusting a response velocity of the plurality of pixels when the image displayed by the electro-optical panel is switched, on a basis of an order of supply of the image signal or of a position of a pixel at the electro-optical panel.

DESCRIPTION OF EXEMPLARY EMBODIMENTS

Below, embodiment will be described with reference to the drawings. It should be noted that, in each of the drawings, the dimension and scale of each portion is set so as to appropriately differ from the actual dimension and scale of each corresponding portion. In addition, the exemplary embodiment described below is a preferred specific example, and hence, various types of technically preferred limitations are applied. Thus, the scope of the present disclosure is not limited to these modes, unless there is a description that limits the present disclosure in the following description.

1. EMBODIMENT

First, one example of the outline of a projector 1 according to an embodiment will be described with reference to FIG. 1.

Figure 1:
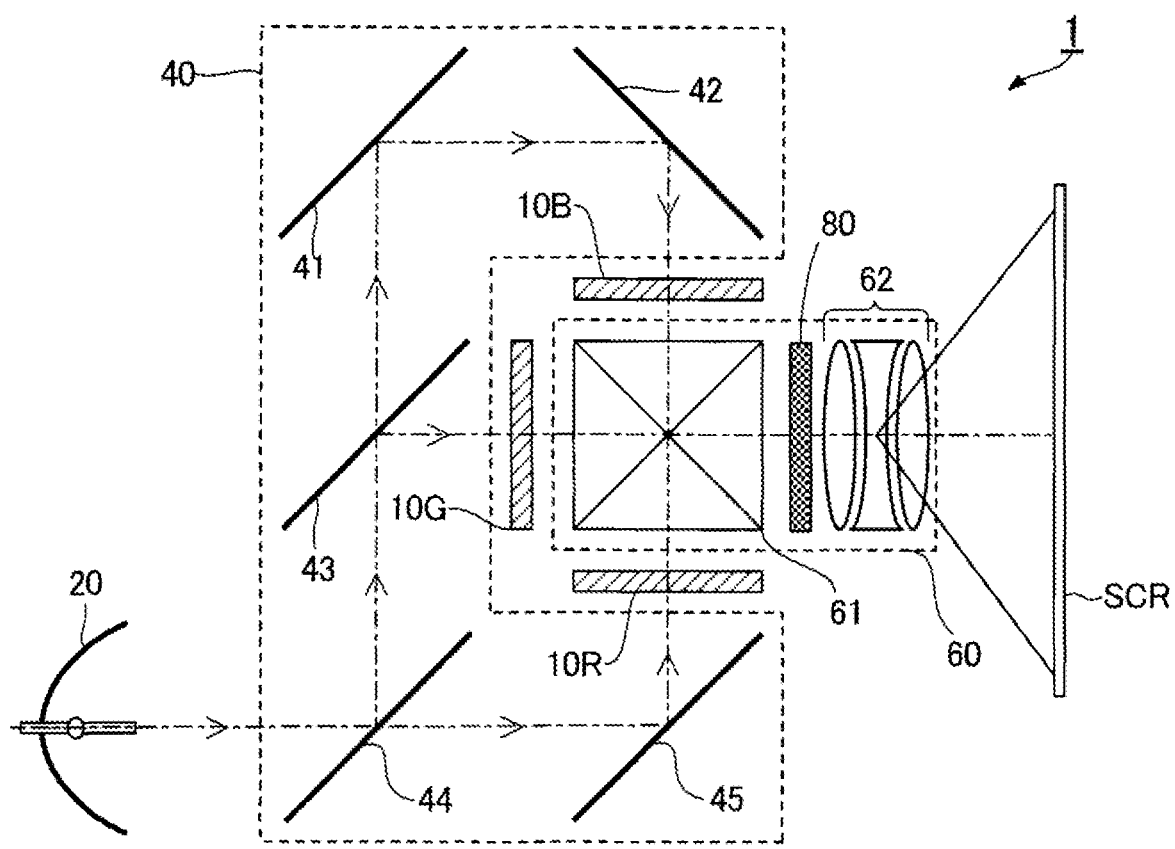
FIG. 1 is an explanatory diagram illustrating an example of a configuration of an optical system of a projector according to an embodiment.

FIG. 1 is an explanatory diagram illustrating an example of the configuration of an optical system of the projector 1 according to the embodiment. Note that an example of the configuration of a control system of the projector 1 will be described with reference to FIG. 4.

Figure 4:
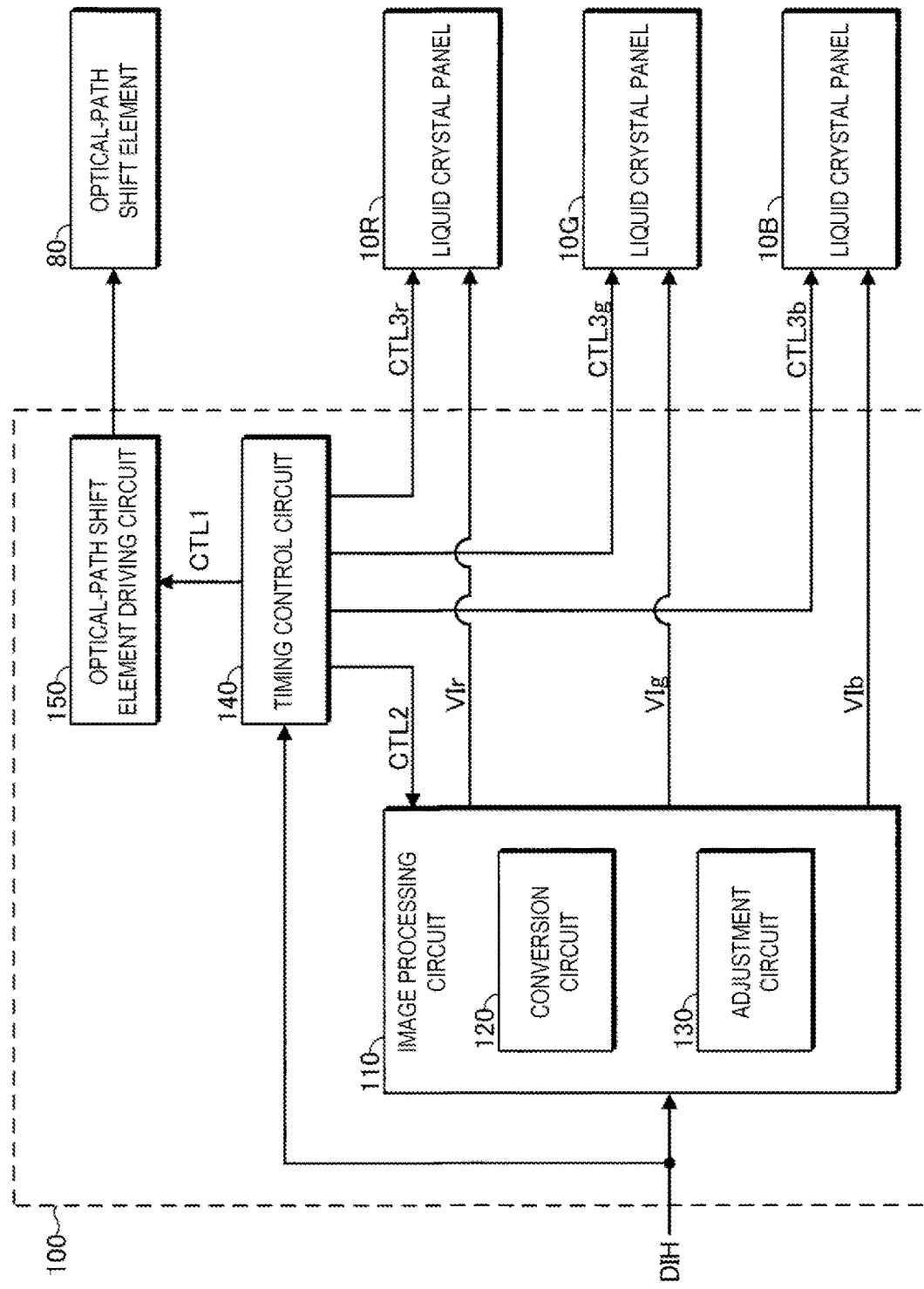
FIG. 4 is a block diagram illustrating an example of a configuration of a control system of the projector illustrated in FIG. 1.

In the projector 1, optical pixel shift, which will be described later, is performed. For example, the projector 1 includes an illumination device 20, a separation optical system 40, three liquid crystal panels 10R, 10G, and 10B, and a projection optical system 60. Note that, in addition to the elements illustrated in FIG. 1, the projector 1 includes a control circuit 100 that will be described later, as illustrated in FIG. 4. The liquid crystal panel 10 serves as an example of an "electro-optical panel".

The illumination device 20 emits white light that is visible light. For example, the illumination device 20 includes a laser light source or a halogen lamp light source.

The separation optical system 40 includes three mirrors 41, 42, and 45, and dichroic mirrors 43 and 44. For example, the separation optical system 40 separates the white light emitted from the illumination device 20, into color light components of red, green, and blue that are three primary colors of light.

Specifically, for example, of the white light emitted from the illumination device 20, the dichroic mirror 44 allows light having a wavelength region of red to pass through, and reflects light having wavelength regions of green and blue. The light having a wavelength region of red and passing through the dichroic mirror 44 is guided by the mirror 45 to the liquid crystal panel 10R. Furthermore, the light having wavelength regions of green and blue and reflected on the dichroic mirror 44 reaches the dichroic mirror 43. Of the light having wavelengths of green and blue and reflected on the dichroic mirror 44, the dichroic mirror 43 allows the light having a wavelength region of blue to pass through and reflects the light having a wavelength region of green. The light having a wavelength region of green and reflected on the dichroic mirror 43 is guided to the liquid crystal panel 10G. In addition, the light having a wavelength region of blue and passing through the dichroic mirror 43 is guided by the mirrors 41 and 42 to the liquid crystal panel 10G.

In this manner, light corresponding to primary colors of red, green, and blue enters the liquid crystal panel 10R, 10G, and 10B. Thus, in the present embodiment, no color filter needs to be provided at the liquid crystal panel 10R, 10G, or 10B.

Each of the liquid crystal panels 10R, 10G, and 10B is used as a spatial light modulator. Specifically, as described below with reference to FIG. 2, each of the liquid crystal panels 10R, 10G, and 10B includes pixels PX provided so as to correspond to intersections between m pieces of scanning lines SLN and n pieces of data lines DLN. That is, in the present embodiment, each of the liquid crystal panels 10R, 10G, and 10B includes a plurality of pixels PX arrayed in a matrix manner in m rows (vertical direction) and n columns (horizontal direction). Note that the "m" is an integer equal to or more than 2, and the "n" is an integer equal to or more than 2. For example, at each of the liquid crystal panels 10R, 10G, and 10B, light is emitted from the plurality of pixels arrayed in the matrix manner to project an image. For example, at each of the pixels PX, the transmittance of the emitted light relative to the incident light is controlled in accordance with the gradation. Hereinafter, the liquid crystal panels 10R, 10G, and 10B may be collectively referred to as a liquid crystal panel 10.

The projection optical system 60 includes a dichroic prism 61, a projection lens system 62, and an optical-path shift element 80. The light modulated by the liquid crystal panel 10R, the light modulated by the liquid crystal panel 10G, and the light modulated by the liquid crystal panel 10B enter the dichroic prism 61 from three directions differing from each other. In addition, at the dichroic prism 61, the light having a wavelength region of red and the light having a wavelength region of blue are refracted at 90 degrees, and the light having a wavelength region of green travels straight. With this configuration, an image in red, an image in green, and an image in blue are combined with each other.

The light emitted from the dichroic prism 61 passes through the optical-path shift element 80 to reach the projection lens system 62. That is, the optical-path shift element 80 is disposed between the dichroic prism 61 and the projection lens system 62. The optical-path shift element 80 causes the optical path of the light emitted from the dichroic prism 61 to be shifted. That is, the optical-path shift element 80 changes the optical path of the light emitted from the plurality of pixels PX included in the liquid crystal panel 10. With this configuration, the position of a pixel displayed at the projection surface SCR is shifted. Hereinafter, the position of a pixel displayed at the projection surface SCR is also referred to as a projection position.

In the present embodiment, it is assumed that the optical-path shift element 80 is able to shift the projection position in the horizontal direction and the vertical direction on the projection surface SCR. Note that, in FIG. 1, the horizontal direction on the projection surface SCR is a direction coming out of the plane of the paper or going behind the plane of the paper, and the vertical direction of the projection surface SCR is a vertical direction on the plane of the paper. Hereinbelow, the shift of the projection position is also referred to as pixel shift.

The projection lens system 62 causes the light emitted from the optical-path shift element 80 to be projected onto the projection surface SCR such as a screen. More specifically, for example, the projection lens system 62 enlarges the combined image emitted from the dichroic prism 61 and passing through the optical-path shift element 80, and projects this enlarged combined image onto the projection surface SCR.

Here, the transmitted images from the liquid crystal panels 10R and 10B are reflected on the dichroic prism 61, and are projected onto the projection surface SCR. On the other hand, the transmitted image from the liquid crystal panel 10G travels straight through the dichroic prism 61, and is projected onto the projection surface SCR. Thus, the image formed by each of the liquid crystal panels 10R and 10B and the image formed by the liquid crystal panel 10G have a relationship in which left and right are reversed.

Figure 2:
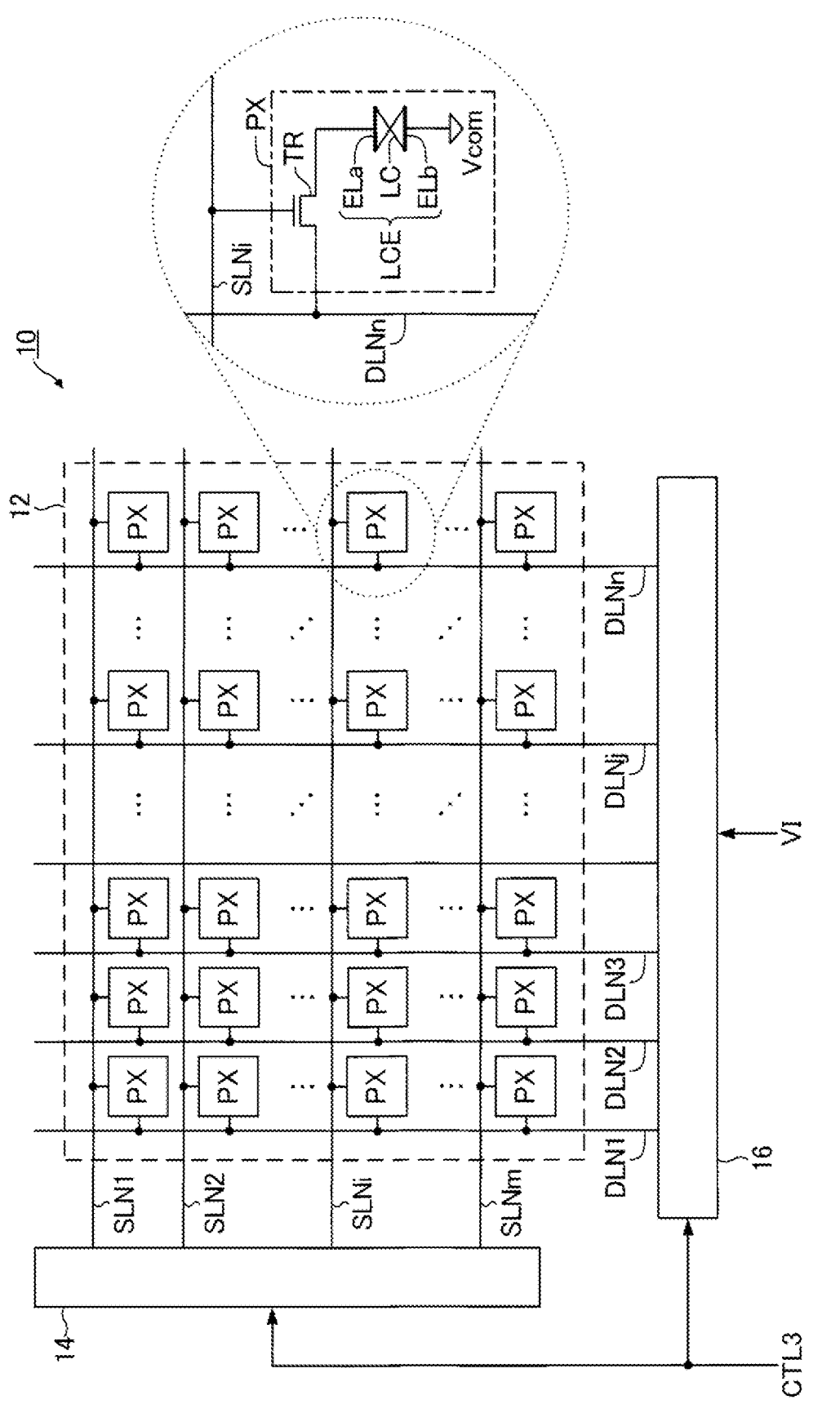
FIG. 2 is an explanatory diagram illustrating one example of a liquid crystal panel illustrated in FIG. 1.

FIG. 2 is an explanatory diagram illustrating one example of the liquid crystal panel 10 illustrated in FIG. 1. Note that the liquid crystal panels 10R, 10G, and 10B are similar to each other. Thus, the liquid crystal panels 10R, 10G, and 10B will be described by using the liquid crystal panel 10 illustrated in FIG. 2. In addition, FIG. 2 also illustrates one example of the configuration of the pixels PX.

For example, the liquid crystal panel 10 includes m pieces of scanning lines SLN, n pieces of data lines DLN, a display region 12, a scanning line drive circuit 14, and a data line driving circuit 16. Note that the "m" is an integer equal to or more than 2, and the "n" is an integer equal to or more than 2. In FIG. 2, the characters "1", "2", "i", and "m" each indicating a row number are attached at the end of the reference characters of the scanning lines SLN in order to distinguish the m pieces of scanning lines SLN from each other. Similarly, the charters "1", "2", "3", "j", and "n" each indicating a column number are attached at the end of the reference characters of the data lines DLN in order to distinguish the n pieces of data lines DLN from each other. Note that, in the example illustrated in FIG. 2, the "i" is an integer not less than 3 and less than m, and the "j" is an integer not less than 4 and less than n. However, the "i" may be an integer not less than 1 and not more than m, and the "j" may be an integer not less than 1 and not more than n.

The m pieces of scanning lines SLN extend in the horizontal direction on the plane of the paper in FIG. 2, and the n pieces of data lines DLN extend in the vertical direction on the plane of the paper in FIG. 2. Furthermore, the display region 12 includes the pixels PX provided so as to each correspond to an intersection between each of the m pieces of scanning lines SLN and each of the n pieces of data lines DLN. That is, the plurality of pixels PX are arrayed in the display region 12 in a matrix manner in m rows (vertical direction) and n columns (horizontal direction). Note that the horizontal direction of the display region 12 is the horizontal direction of the liquid crystal panel 10, and corresponds to the horizontal direction on the projection surface SCR. In addition, the vertical direction of the display region 12 is the vertical direction of the liquid crystal panel 10, and corresponds to the vertical direction on the projection surface SCR.

Here, for example, the plurality of pixels PX each include a transistor TR and a liquid crystal element LCE. The liquid crystal element LCE includes, for example, a pixel electrode ELa having a substantially square shape in plan view, a counter electrode ELb that faces the pixel electrode ELa, and a VA-type liquid crystal LC disposed between the pixel electrode ELa and the counter electrode ELb. For example, the liquid crystal element LCE has transmittance according to the effective value of voltage between the pixel electrode ELa and the counter electrode ELb. Note that the present embodiment assumes that the liquid crystal element LCE has a normally black mode. In a case of the normally black mode, when the voltage between the pixel electrode ELa and the counter electrode ELb is large, the transmittance of the liquid crystal element LCE is larger, as compared with the transmittance when the voltage between the pixel electrode ELa and the counter electrode ELb is small.

The counter electrode ELb is common among the plurality of pixels PX, and a common voltage Vcom that is a constant voltage is supplied to the counter electrode ELb. The transistor TR is, for example, an n-channel type thin film transistor, and is configured to control electrical coupling between the pixel electrode ELa and the data line DLN. For example, the gate of the transistor TR is connected to the scanning line SLN. The source of the transistor TR is connected to the data line DLN. The drain of the transistor TR is connected to the pixel electrode ELa. Note that the plurality of pixels PX may each include a storage capacity disposed parallel to the liquid crystal element LCE.

The scanning line drive circuit 14 selects a scanning line SLN one by one in a predetermined order on the basis of a control signal CTL3, and supplies the selected scanning line SLN with a high-level scanning signal. Note that the scanning line drive circuit 14 supplies a low-level scanning signal to scanning lines SLN other than the selected scanning line SLN. In the present embodiment, it is assumed that the predetermined order is an order of 1, 2, . . . , and m-th row. That is, in the present embodiment, scanning is performed to the plurality of pixels PX in the order of 1, 2, . . . , and m-th row.

The data line driving circuit 16 latches an output image signal VI for one row. Then, the data line driving circuit 16 supplies each of the n pieces of data lines DLN with the output image signal VI for each column in the row corresponding to the scanning line SLN selected by the high-level scanning signal. Note that latching of the output image signal VI and supply of the output image signal VI to the data line DLN are performed, for example, on the basis of the control signal CTL3.

As the transistor TR connected to the scanning line SLN supplied with the high-level scanning signal is turned on, the output image signal VI supplied to the data line DLN is supplied to the pixel electrode ELa. When the level of the scanning signal is switched from the high level to the low level, the transistor TR is turned off. However, the voltage of the output image signal VI supplied to the pixel electrode ELa is maintained due to a capacitive property of the liquid crystal element LCE. In this manner, the transmittance of light emitted from the liquid crystal element LCE is controlled by the output image signal VI corresponding to the gradation. That is, in each of the pixels PX, the transmittance of the emitted light relative to the incident light is controlled in accordance with the gradation. Thus, the modulated image, based on the output image signal VI is generated. Hereinafter, the transmittance of the liquid crystal element LCE is also referred to as transmittance of a pixel PX.

In this manner, in the liquid crystal panel 10, there is a certain difference, for example, between timing at which the output image signal VI is supplied to a pixel PX disposed in an upper portion of the display region 12 and timing at which the output image signal VI is supplied to a pixel PX disposed in a lower portion of the display region 12. For this reason, for example, even when all the pixels PX are switched to have the same transmittance, a situation happens in which the transmittance of a pixel PX in one row of the plurality of rows differs from the transmittance of a pixel PX in another row.

The optical-path shift element 80 changes the state so as to increase, in a pseudo manner, the resolution of an image to be projected onto the projection surface SCR. As the liquid crystal panel 10 drives in a manner described above, the difference between the actual transmittance of the pixel PX and the target transmittance may vary according to the rows where the pixels PX are arrayed, during a period of time when the state of the optical-path shift element 80 does not change.

When the variation in the difference between the actual transmittance of the pixel PX and the target transmittance is large during a period of time when the state of the optical-path shift element 80 does not change, the quality of an image that a user visually recognizes deteriorates, as compared with a case when the variation in the difference between the actual transmittance of the pixel PX and the target transmittance is low. For this reason, in the present embodiment, the output image signal VI is generated so as to suppress an increase in the variation in the difference between the actual transmittance of the pixel PX and the target transmittance during a period of time when the state of the optical-path shift element 80 does not change.

Note that the projector 1 employs polarity reversal drive in which the polarity of the voltage applied to the liquid crystal element LCE is reversed for each certain cycle in order to prevent an electro-optic material from electrically deteriorating. The present embodiment assumes that the cycle of reversing the polarity of the output image signal VI is half the period of the field period FL illustrated in FIG. 3 that will be described later. However, the cycle of reversing the polarity of the output image signal VI is not limited to half the period of the field period FL. For example, the cycle of reversing the polarity of the output image signal VI may be one field period FL, or may be one frame period FM illustrated in FIG. 3 that will be described later. Before generation of the output image signal VI is described, the effect of pixel shift will be described with reference to FIG. 3.

Figure 3:
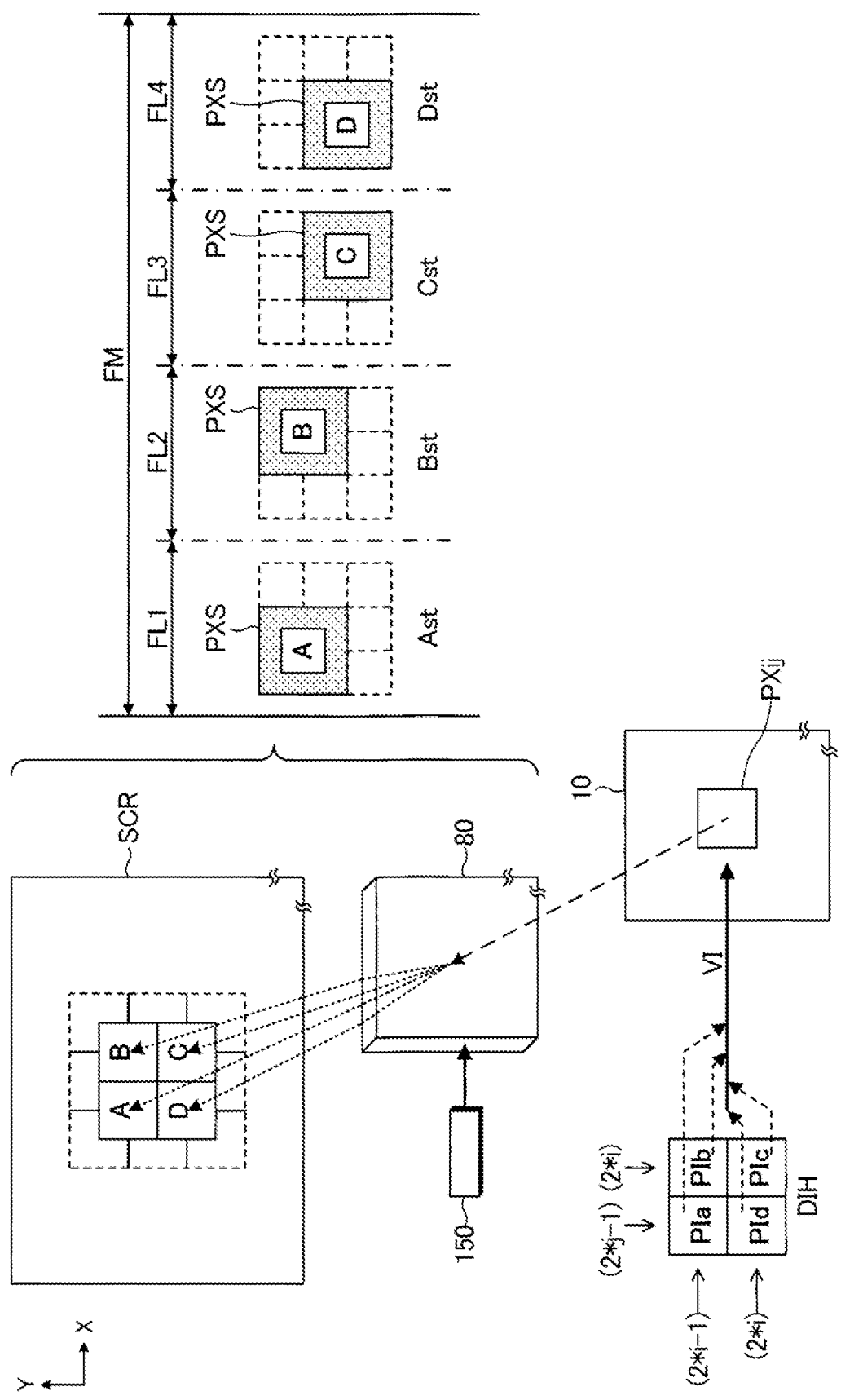
FIG. 3 is an explanatory diagram schematically illustrating an effect of pixel shift.

FIG. 3 is an explanatory diagram schematically illustrating the effect of pixel shift. For the purpose of convenience in terms of explanation, FIG. 3 employs a Cartesian coordinate system with two axes including the X-axis and the Y-axis that are perpendicular to each other. Below, the direction pointed by the arrow of the X-axis is referred to as the +X direction, and the direction opposite from the direction of the +X direction is referred to as the −X direction. In addition, the direction pointed by the arrow of the Y-axis is referred to as the +Y direction, and the direction opposite from the direction of the +Y direction is referred to as the −Y direction. Furthermore, below, the +X direction and the −X direction may not be distinguished from each other and be referred to as the X direction. In addition, +Y direction and the −Y direction may not be distinguished from each other and be referred to as the Y direction. The X direction corresponds to the horizontal direction on the projection surface SCR. The Y direction corresponds to the vertical direction on the projection surface SCR.

In the pixel shift, one frame period FM corresponding to one frame is divided into a plurality of field periods FL. In addition, the optical-path shift element 80 is controlled by an optical-path shift element driving circuit 150 so that the states of the optical-path shift element 80 differ from field period FL to field period FL. Here, one frame period FM is, for example, a period for the liquid crystal panel 10 to display one frame of an input image indicated by an input image signal DIH. The present embodiment assumes that one frame period FM is divided into four field periods FL1, FL2, FL3, and FL4. The field period FL is an example of a "unit period". In addition, when the field period FL1 is the "first unit period", the field period FL2 is the "second unit period". When the field period FL2 is the "first unit period", the field period FL3 is the "second unit period". Furthermore, when the field period FL3 is the "first unit period", the field period FL4 is the "second unit period".

In FIG. 3, the pixel shift is described by using, as an example, a case where four pixels PIa, PIb, PIc, and PId of an image indicated by the input image signal DIH are projected onto the projection surface SCR by using one pixel PXij of each of the liquid crystal panels 10R, 10G, and 10B.

The optical-path shift element 80 is controlled by the optical-path shift element driving circuit 150 so that the light from the pixel PXij of the liquid crystal panel 10 is caused to reach the individual positions A, B, C, and D on the projection surface SCR in the corresponding field periods FL1, FL2, FL3, and FL4. The pixel PXij of the liquid crystal panel 10 displays the pixels PIa, PIb, PIc, and PId of an input image in the corresponding field periods FL1, FL2, FL3, and FL4.

Of the plurality of pixels PI of an input image indicated by the input image signal DIH, the pixel PIa is a pixel PI at the "2*i−1"-th row and "2*j−1"-th column. Of the plurality of pixels PI, the pixel PIb is a pixel PI at the "2*i−1"-th row and "2*j"-th column. In addition, of the plurality of pixels PI, the pixel PIc is a pixel PI at the "2*i"-th row and "2*j"-th column. Furthermore, of the plurality of pixels PI, the pixel PId is a pixel PI at the "2*i"-th row and "2*j−1"-th column. Note that the "i" is an integer not less than 1 and not more than m, and the "j" is an integer not less than 1 and not more than n.

In addition, the pixel PXij in FIG. 3 is a pixel PR at the i-th row and j-th column at each of the liquid crystal panels 10R, 10G, and 10B.

Furthermore, of the plurality of pixels PXS to be onto the projection surface SCR, the pixel PXS in FIG. 3 indicates a pixel PXS corresponding to the pixel PXij at each of the liquid crystal panels 10R, 10G, and 10B.

Hereinbelow, a state of the optical-path shift element 80 that causes the light emitted from the pixel PXij of the liquid crystal panel 10 to reach a first position A at the projection surface SCR is also referred to as a first state Ast. Furthermore, a state of the optical-path shift element 80 that causes the light emitted from the pixel PXij to reach a second position B at the projection surface SCR is also referred to as a second state Bst. A state of the optical-path shift element 80 that causes the light emitted from the pixel PXij to reach a third position C at the projection surface SCR is also referred to as a third state Cst. In addition, a state of the optical-path shift element 80 that causes the light emitted from the pixel PXij to reach a fourth position D at the projection surface SCR is also referred to as a fourth state Dst.

Note that the first position A at the projection surface SCR is a position shifted from the fourth position D in the +Y direction by a pitch of ½ pixel. The pitch of ½ pixel corresponds, for example, to a distance between the center of one pixel PXS of two pixels PXS adjacent to each other and the center of the other pixel PXS in an image projected at the projection surface SCR in one field period FL. For example, a position shifted from the first position A in the +X direction by a pitch of ½ pixel at the projection surface SCR is the second position B. A position shifted from the second position B in the −Y direction by a pitch of ½ pixel is the third position C. A position shifted from the third position C in the −X direction by a pitch of ½ pixel is the fourth position D.

In the pixel shift illustrated n FIG. 3, the optical-path shift element 80 is controlled so that the position, at the projection surface SCR, that the light emitted from the pixel PXij of the liquid crystal panel 10 reaches is shifted to the first position A, the second position B, the third position C, and the fourth position D in one frame period FM. For example, the optical-path shift element 80 is controlled so that the state is brought into the first state Ast, the second state Bst, the third state Cst, and the fourth state Dst in the corresponding field periods FL1, FL2, FL3, and FL4.

In the field period FL1, the light corresponding to the pixel PIa of an input image is emitted from the pixel PXij of the liquid crystal panel 10. Then, the light emitted from the pixel PXij of the liquid crystal panel 10 passes through the optical-path shift element 80 of which state is the first state Ast, and reaches the first position A at the projection surface SCR.

In addition, in the field period FL2, the light corresponding to the pixel PIb of the input image is emitted from the pixel PXij of the liquid crystal panel 10. Then, the light emitted from the pixel PXij of the liquid crystal panel 10 passes through the optical-path shift element 80 of which state is the second state Bst, and reaches the second position B at the projection surface SCR.

Furthermore, in the field period FL3, the light corresponding to the pixel PIc of the input image is emitted from the pixel PXij of the liquid crystal panel 10. Then, the light emitted from the pixel PXij of the liquid crystal panel 10 passes through the optical-path shift element 80 of which state is the Third state Cst, and reaches the third position C at the projection surface SCR.

In addition, in the field period FL4, the light corresponding to the pixel PId of the input image is emitted from the pixel PXij of the liquid crystal panel 10. Then, the light emitted from the pixel PXij of the liquid crystal panel 10 passes through the optical-path shift element 80 of which state is the fourth state Dst, and reaches the fourth position D at the projection surface SCR.

In this manner, the pixel shift increases, in a pseudo manner, the resolution of an image to be projected onto the projection surface SCR. For example, the pixels PXS displayed at the first position A and the second position B at the projection surface SCR correspond to the two pixels PIa and PIb at the "2*i−1"-th row and "2*j−1"-th column and the "2*j"-th column of the input image. In addition, the pixels displayed at the fourth position C and the third position C at the projection surface SCR correspond to the two pixels PId and PIc at the "2*i"-th row and "2*j−1"-th column and the "2*"-th column of the input image.

Note that the order in which and the positions at which the light emitted from the pixel PX of the liquid crystal panel 10 shifts at the projection surface SCR are not limited to the example illustrated in FIG. 3. Next, the configuration of the control system of the projector 1 will be described with reference to FIG. 4.

FIG. 4 is a block diagram illustrating an example of the configuration of the control system of the projector 1 illustrated in FIG. 1. In addition to the elements illustrated in FIG. 1, the projector 1 includes the control circuit 100.

The control circuit 100 controls, for example, the liquid crystal panels 10R, 10G, and 10B, and the optical-path shift element 80. For example, the control circuit 100 generates output image signals VIr, VIg, and VIb used to drive the liquid crystal panel 10R, 10G, and 10B, on the basis of an input image signal DIH supplied from an upper-level device such as a host device (not illustrated) to the control circuit 100. In FIG. 4, in order to distinguish the output image signals VI supplied to the liquid crystal panels 10R, 10G, and 10B from each other, lowercase alphabets "r", "g", and "b" are attached at the end of the reference letters of the output image signals VI. In addition, the control circuit 100 generates control signals used co drive the optical-path shift element 80 on the basis of the input image signal DIH.

For example, the control circuit 100 includes an image processing circuit 110 including a conversion circuit 120 and an adjustment circuit 130, a timing control circuit 140, and the optical-path shift element driving circuit 150.

For example, in each of the plurality of field periods FL included in one frame period FM, the image processing circuit 110 generates output image signal VIr, VIg, and VIb used to drive the liquid crystal panel 10R, 10G, and 10B, on the basis of the input image signal DIH. For example, the output image signal VIr used to drive the liquid crystal panel 10R is generated so as to correspond to the plurality of pixels PX of the liquid crystal panel 10R, and is supplied to the plurality of pixels PX in a predetermined order. In addition, the output image signal VIg used to drive the liquid crystal panel 10G is generated so as to correspond to the plurality of pixels PX of the liquid crystal panel 10G, and is supplied to the plurality of pixels PX in a predetermined order. Furthermore, the output image signal VIb used to drive the liquid crystal panel 10B is generated so as to correspond to the plurality of pixels PX of the liquid crystal panel 10B, and is supplied to the plurality of pixels PX in a predetermined order.

In this manner, in each of the plurality of field periods FL of one frame period FM, the image processing circuit 110 supplies the output image signals VI to the plurality of pixels PX of the liquid crystal panel 10 in a predetermined order, the output image signals VI corresponding to the plurality of pixels PX and being generated on the basis of the input image signal DIH. Note that the predetermined order is, for example, an order in which the scanning line SLN is selected. In addition, the output image signal VI serves as an example of the "image signal".

The conversion circuit 120 is configured, for example, to accumulate the input image signal DIH, and output the accumulated input image signal DIH to the adjustment circuit 130. The adjustment circuit 130 is configured to adjust the response velocity of the plurality of pixels PX at the time of switching an image to be projected from the liquid crystal panel 10, on the basis of the order in which the output image signal VI is supplied or of the position of the pixel PX at the liquid crystal panel 10. Although specific description will be made with reference to FIG. 6, the response velocity of the plurality of pixels PX is adjusted by adjusting the gradation value of the output image signal VI.

The timing control circuit 140 is configured to generate a control signal CTL1 used to control the optical-path shift element driving circuit 150, on the basis of the input image signal DIH. For example, the timing control circuit 140 is configured to perform time-division of one frame period FM into a plurality of field periods FL. Then, the timing control circuit 140 supplies the optical-path shift element driving circuit 150 with the control signal CTL1 used to control the state of the optical-path shift element 80 for each of the field periods FL. In this manner, the control signal CTL1 is a signal used to control the state of the optical-path shift element 80. Thus, the control signal CTL1 is also a signal used to control the projection position of the light emitted from the optical-path shift element 80.

Furthermore, the timing control circuit 140 is configured to generate a control signal CTL2 used to control the adjustment circuit 130, on the basis of the input image signal DIH. Since the control signals CTL1 and CTL2 are generated on the basis of the input image signal DIH, the adjustment circuit 130 is, for example, able to output the output image signals VIr, VIg, and VIb so as to synchronize with the change of the states of the optical-path shift element 80 resulting from the pixel shift.

Furthermore, the timing control circuit 140 is configured to generate control signals CTL3r, CTL3g, and CTL3b such as a clock signal used to supply the output image signals VI to each of the pixel electrodes ELa of the liquid crystal panels 10R, 10G, and 10B. Furthermore, the timing control circuit 140 supplies the control signals CTL3r, CTL3g, and CTL3b to the liquid crystal panels 10R, 10G, and 10B, respectively. Note that, in FIG. 4, in order to distinguish the control signals CTL3 supplied to the liquid crystal panels 10R, 10G, and 10B from each other, lowercase alphabets "r", "g", and "b" are attached at the end of the reference letters of the control signals CTL3.

The optical-path shift element driving circuit 150 is configured to drive the optical-path shift element 80 on the basis of the control signal CTL1 supplied from the timing control circuit 140. For example, on the basis of the control signal CTL1, the optical-path shift element driving circuit 150 changes the states of the optical-path shift element 80 in the order of the first state Ast, the second state Bst, the third state Cst, and the fourth state Dst so as to synchronize with the field periods FL.

Next, the configuration of the image processing circuit 110 will be described in detail with reference to FIG. 5.

Figure 5:
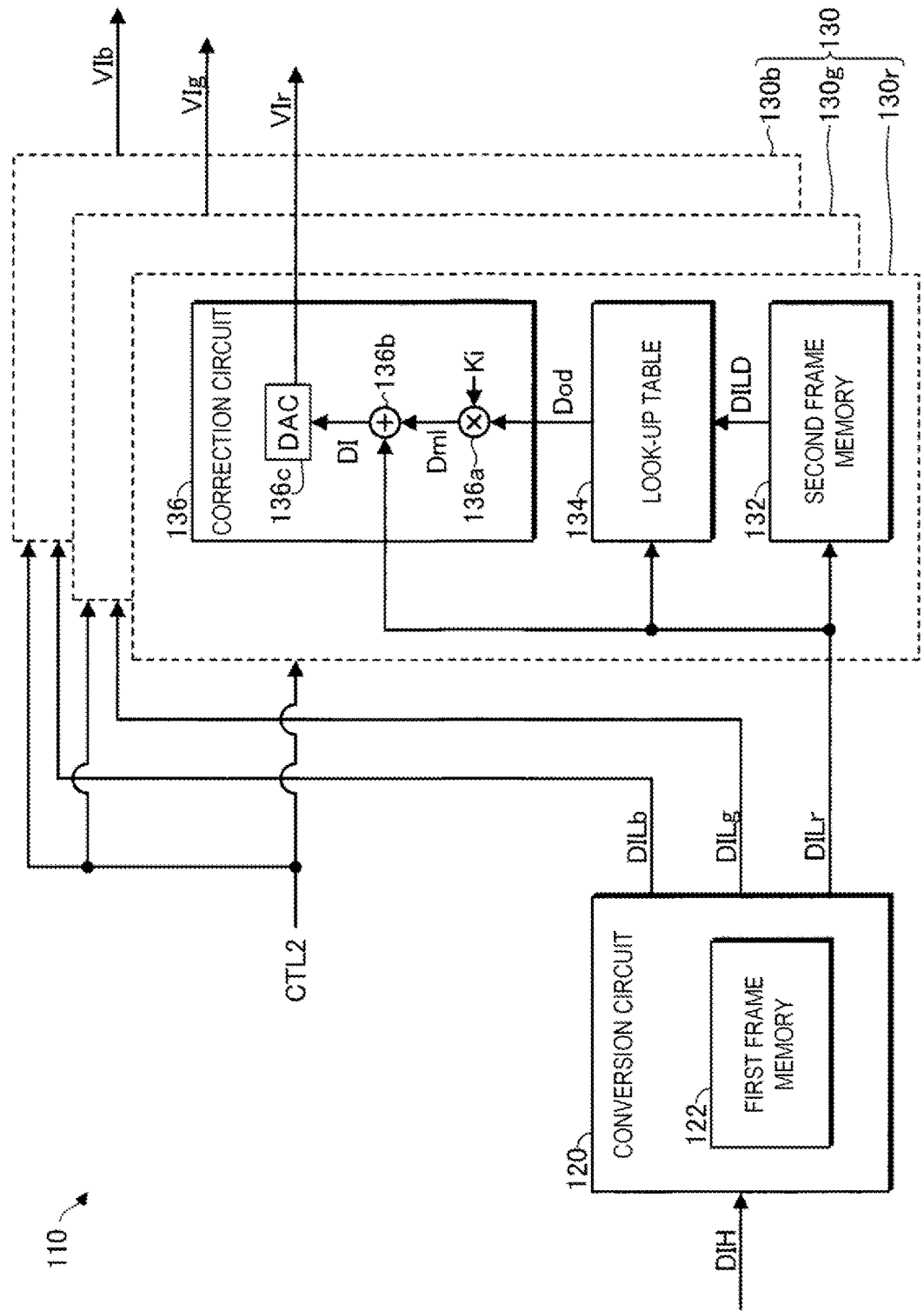
FIG. 5 is a block diagram illustrating an example of a configuration of an image processing circuit illustrated in FIG. 4.

FIG. 5 is a block diagram illustrating an example of the configuration of the image processing circuit 110 illustrated in FIG. 4. The image processing circuit 110 includes the conversion circuit 120 and the adjustment circuit 130. The adjustment circuit 130 includes, for example, an adjustment circuit 130r configured to supply the output image signal VIr to the liquid crystal panel 10R, an adjustment circuit 130g configured to supply the output image signal VIg to the liquid crystal panel 10G, and an adjustment circuit 130b configured to supply the output image signal VIb to the liquid crystal panel 10B. Although the adjustment circuit 130r is described in FIG. 5, the adjustment circuit 130g and the 130b are configured in a manner similar to that of the adjustment circuit 130r. In addition, the operation of the conversion circuit 120 to the adjustment circuit 130 will also be described by using, as an example, the operation of the conversion circuit 120 to the adjustment circuit 130r.

The conversion circuit 120 is configured to convert the input image signal DIH into the image signal DIL. For example, the input image signal DIH is an image signal indicating an input image with the "2*m" pixels in the vertical direction and the "2*n" pixels in the horizontal direction. Note that the "m" and the "n" are each integers equal to or more than 2 as described with reference to FIG. 2 or the like. The image signal DIL is an image signal indicating an image with the in pixels in the vertical direction and n pixels in the horizontal direction. The input image signal DIH and the image signal DIL each include image signals having red, green, and blue components. In FIG. 5, in order to distinguish the image signals DIL supplied to the adjustment circuits 130r, 130g, and 130b from each other, lowercase alphabets "r", "g", and "b" are attached at the end of the reference letters of the image signals DIL.

The conversion circuit 120 includes, for example, a first frame memory 122 configured to hold one frame of an input image signal DIH. For example, the conversion circuit 120 uses the first frame memory 122 to generate the image signal DIL.

For example, the conversion circuit 120 reads out, from the first frame memory 122, the input image signal DIH corresponding to a pixel PI of an input image that is disposed at odd rows and odd columns. Then, of the input image signal DIH read out from the first frame memory 122, the conversion circuit 120 supplies an input image signal DIH with a red component to the adjustment circuit 130r as the image signal DILr for the field period FL1. Note that, of the input image signal DIH read out from the first frame memory 122, an input image signal DIH with a green component is supplied to the adjustment circuit 130g as the image signal DILg for the field period FL1. In addition, of the input image signal DIH read out from the first frame memory 122, an input image signal DIH with a blue component is supplied to the adjustment circuit 130b as the image signal DILb for the field period FL1.

The image signals DILr, DILg, and DILb for each of the field periods FL2, FL3, and FL4 are also supplied to the adjustment circuits 130r, 130g, and 130b, respectively, as with the image signals DILr, DILg, and DILb for the field period FL1. For example, the conversion circuit 120 reads out, from the first frame memory 122, the input image signal DIH corresponding to a pixel PI of an input image that is disposed at an odd row and an even column, as the image signals DILr, DILg, and DILb for the field period FL2. Furthermore, the conversion circuit 120 reads out, from the first frame memory 122, the input image signal DIP corresponding to a pixel PI of an input image that is disposed at an even row and an even column, as the image signals DILr, DILg, and DILb for the field period FL3. In addition, the conversion circuit 120 reads out, from the first frame memory 122, the input image signal DIH corresponding to a pixel PI of an input image that is disposed at an even row and an odd column, as the image signals DILr, DILg, and DILb for the field period FL4.

The adjustment circuit 130r includes a second frame memory 132, a look-up table 134, and a correction circuit 136. The storage capacity of the second frame memory 132 is smaller than the storage capacity of a storage region of the first frame memory 122 of the conversion circuit 120 where the input image signal DIH with a red component is held.

For example, the storage capacity of the second frame memory 132 of the adjustment circuit 130r is a quarter of the storage capacity of the first frame memory 122 of the conversion circuit 120 where the input image signal DIH with a red component is held. Note that the second frame memory 132 of the adjustment circuit 130r is only necessary to have a storage capacity that holds at least an image signal DILr for one screen of the liquid crystal panel 10R.

The look-up table 134 is supplied with the image signal DILr read out from the first frame memory 122 and the image signal DILD read out from the second frame memory 132. The image signal DILD is a past image signal DILr one field period FL prior to the image signal DILr read out from the first frame memory 122.

The look-up table 134 is, for example, a two-dimensional look-up table that holds in advance data Dod for overdrive, so as to correspond to the gradation level indicated by the image signal DILr and the gradation level indicated by the image signal DILD. The value of the data Dod is determined in advance, for example, on the basis of the response characteristic of the liquid crystal element LCE.

For example, when the gradation level indicated by the image signal DILr is greater than the gradation level indicated by the image signal DILD, the data Dod indicating a positive value is outputted from the look-up table 134. In addition, when the gradation level indicated by the image signal DILr is smaller than the gradation level indicated by the image signal DILD, the data Dod indicating a negative value is outputted from the look-up table 134. Furthermore, when the gradation level indicated by the image signal DILr is equal to the gradation level indicated by the image signal DILD, the data Dod indicating zero is outputted from the look-up table 134.

The data Dod outputted from the look-up table 134 is supplied to the correction circuit 136. Note that the data Dod serves as an example of the "compensation amount determined through overdrive processing". In addition, the data Dml, which will be described later, serves as an example of the "compensation amount used to generate an image signal".

The correction circuit 136 includes a multiplier 136a, an adder 136b, and a DAC 136c. Note that the "DAC" stands for a digital analog converter. The multiplier 136a multiplies, by a factor Ki, the data Dod outputted from the look-up table 134, and outputs the result of the multiplication as data Dml for correction, to the adder 136b. Note that the factor Ki is, for example, a factor used to generate the output image signal VIr supplied to a pixel PX connected to a scanning line SLNi at the i-th row, and is set to a positive value. The "i" is an integer not less than 1 and not more than m. In addition, hereinbelow, it is assumed that the "m" is an even number equal to or more than 4, unless otherwise stated.

For example, when the "i" is not less than 1 and not more than "m/2−α", the factor Ki is set to a value greater than 0 and less than 1. When the "i" is more than "m/2−α" and less than "m/2+β", the factor Ki is set to 1. Note that the "α" is an integer not less than 0 and less than "m/2", and the "β" is an integer not less than 1 and not more than "m/2". Furthermore, when, the "i" is not less than "m/2+β" and not more than m, the factor Ki is set to a value more than 1 and less than a predetermined value. There is no particular limitation as to the predetermined value. For example, the predetermined value may be 2. Note that, when α is 0 and β is 1, the condition 'more than "m/2−α" and less than "m/2+β"' is not met. Thus, there is no factor Ki set to 1.

In this manner, the factor Ki used to generate the output image signal VIr supplied to pixels PX connected to scanning lines SLNi from the first row to the "m/2−α"-th row is set to a value more than 0 and less than 1. In addition, the factor Ki used to generate the output image signal VIr supplied to pixels PX connected to scanning lines SLNi from the "m/2+β"-th row to "m"-th row is set to a value more than 1 and less than the predetermined value. Hereinbelow, the pixels PX connected to scanning lines SLNi from the first row to the "m/2−α"-th row are also referred to as upper pixels PX, and the pixels PX connected to scanning lines SLNi from the "m/2+β"-th row to the "m"-th row are also referred to as lower pixels PX.

Note that, for example, when the "i" fails in a range of not less than 1 and not more than "m/2−α", the value of factor Ki when "i" is large is equal to or less than the value of factor Ki when "i" is small. Furthermore, when "i" falls in a range of not less than "m/2+β" and not more than m, the value of factor Ki when "i" is large is equal to or more than the value of factor Ki when "i" is small. Note that, when "i" fails in a range of not less than 1 and not more than "m/2−α", all the factors Ki may be values differing from each other, or at least part of the factors Ki may be equal to each other. For example, the factor Ki when "i" is 1 and the factor Ki when "i" is 2 may be the same value that is greater than 0 and less than 1. Similarly, when "i" fails in a range of not less than "m/2+β" and not more than m, all the factors Ki may be different values, or at least part of the factors Ki may be the same value.

When the factor Ki is set as in the example described above, the data Dml used to generate the output image signal VIr supplied to the upper pixel PH is smaller than the data Dod. In addition, the data Dml used to generate the output image signal VIr supplied to the lower pixel PX is greater than the data Dod.

That is, the correction circuit 136 sets the data Dml used to generate the output image signal VIr supplied to the upper pixel PX, to be smaller than the data Dod determined through the overdrive process. Furthermore, the correction circuit 136 sets the data Dml used to generate the output image signal VIr supplied to the lower pixel PX, to be greater than the data Dod determined through the overdrive process.

Here, in the present embodiment, the scanning line SLN is selected in the order of 1, 2, . . . , and m-th row. Thus, the output image signal VIr is supplied to the plurality of pixels PX in the order of the 1, 2, . . . , and m-th row. For this reason, the order of the 1, 2, . . . , and m-th row corresponds to the "predetermined order". That is, the upper pixel PX is supplied with the output image signal VIr in the first half of the predetermined order, and the lower pixel PX is supplied with the output image signal VIr in the second half of the predetermined order. Thus, the upper pixel PX serves as an example of a "first pixel", and the lower pixel PX serves as an example of a "second pixel". Furthermore, the "first pixel" serves as an example of the pixel PX supplied with the output image signal VIr in the first half of the predetermined order, and the "second pixel" serves as an example of the pixel PX supplied with the output image signal VIr in the second half of the predetermined order.

The adder 136b adds the data Dml to the image signal DILr, and outputs the result of the addition to the DAC 136c as image data DI. Note that, since the data Dod can take a negative value, the data Dml also can take a negative value. Thus, details of calculation by the adder 136b not only include the addition but also substantially include subtraction.

The DAC 136c converts the image data DI into an output image signal VIr in a form of analog voltage. Note that the present embodiment assumes that information indicating the polarity of the output image signal VIr, VIg, and VIb is included in the control signal CTL2. In this case, the DAC 136c converts the image data DI into an output image signal VIr in a form of analog voltage having a polarity designated by the control signal CTL2.

In this manner, the adjustment circuit 130r adds, to the image signal DILr, a correction amount corresponding to an amount of change from the gradation level in the preceding one field period FL and the position of the pixel PX, and converts the result of the addition into an analog one to output the conversion result to the liquid crystal panel 10R as the output image signal VIr. The adjustment circuits 130g and 130b operate in a manner similar to the adjustment circuit 130r.

For example, the adjustment circuit 130g adds, to the image signal DILg, a correction amount corresponding to an amount of change from the gradation level in the preceding one field period FL and the position of the pixel PX, and converts the result of the addition into an analog one to output the conversion result to the liquid crystal panel 10G as the output image signal VIg. Furthermore, the adjustment circuit 130b adds, to the image signal DILb, a correction amount corresponding to an amount of change from the gradation level in the preceding one field period FL and the position of the pixel PX, and converts the result of the addition into an analog one to output the conversion result to the liquid crystal panel 10B as the output image signal VIb.

Note that the configuration of the control circuit 100 is not limited to the example illustrated in FIGS. 4 and 5. For example, the look-up table 134 of the adjustment circuit 130r, the look-up table 134 of the adjustment circuit 130g, and the look-up table 134 of the adjustment circuit 130b may be commonly used by the adjustment circuits 130r, 130g, and 130b. Furthermore, for example, the adjustment circuit 130 may perform calculation to obtain the data Dod for overdrive, rather than using the look-up table 134.

In addition, although the present embodiment assumed that the timing control circuit 140 illustrated in FIG. 4 performs various types of control on the basis of the input image signal DIH, the timing control circuit 140 may perform various types of control on the basis of the image signal DIL outputted from the conversion circuit 120.

Next, the operation of the control circuit 100 will be described with reference to FIG. 6.

Figure 6:
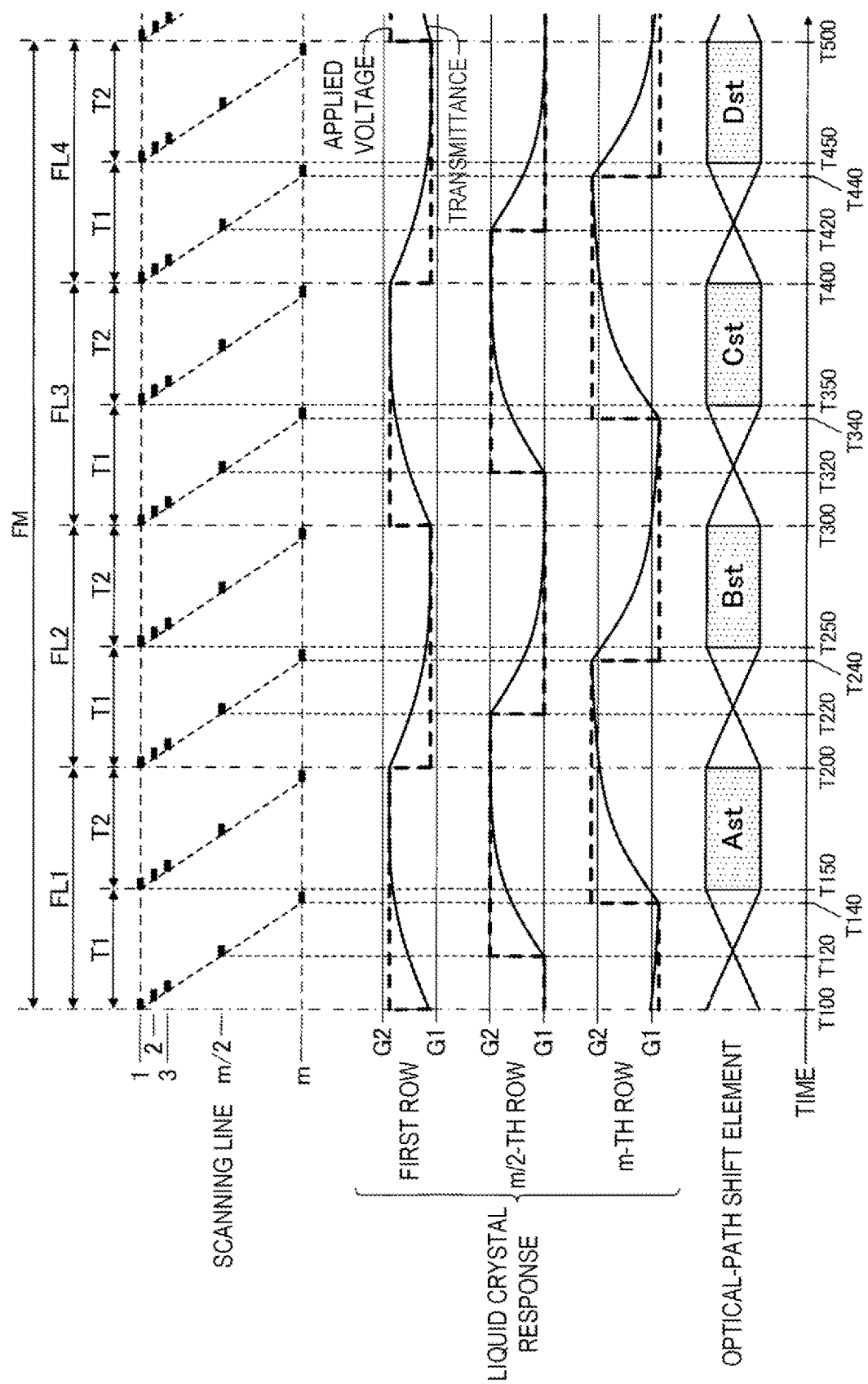
FIG. 6 is a diagram used to explain an operation of a control circuit illustrated in FIG. 4.

FIG. 6 is a diagram used to explain the operation of the control circuit 100 illustrated in FIG. 4. Note that FIG. 6 illustrates one example of a relationship between the transition of selection of scanning lines SLN, the liquid crystal response, and the transition of states of the optical-path shift element 80 with the elapsed time being indicated in the horizontal axis.

In the present embodiment, scanning in which the plurality of pixels PX are selected in the order of 1, 2, . . . , and m-th row is performed two times in each of the plurality of field periods FL1, FL2, FL3, and FL4. For example, the period T1 in each of the field periods FL is a period in which the first scanning is performed. The period T2 is a period subsequent to the period T1, and is a period in which the second scanning is performed. Furthermore, in the present embodiment, the polarity of the output image signal VI supplied to a pixel PX through the second scanning is inverted from the polarity of the output image signal VI supplied to the pixel PX through the first scanning. The period T1 serves as an example of a "first period", and the period T2 serves as an example of a "second period".

As indicated by the rectangle black marking in the diagram of the transition of selection of the scanning lines SLN, the scanning lines SLN are exclusively selected one row by one row in the order of 1, 2, . . . , and m-th row. The pixel PX connected to the scanning line SLN selected by the scanning line drive circuit 14 is supplied with the output image signal VI through the data line DLN. That is, a voltage according to the output image signal VI is applied to the pixel electrode ELa of the pixel PX connected to the scanning line SLN selected by the scanning line drive circuit 14. This causes the liquid crystal element LCE of the pixel PX to be changed into the transmittance according to the voltage of the output image signal VI.

FIG. 6 illustrates, as the liquid crystal response, the change in the transmittance of the liquid crystal element LCE according to the change in the applied voltage to the liquid crystal element LCE. The applied voltage to the liquid crystal element LCE represents a voltage across the pixel electrode ELa and the counter electrode ELb. For example, the waveform with the dashed line of the liquid crystal response illustrated in FIG. 6 indicates the applied voltage to the liquid crystal element LCE, and the waveform with the solid line indicates the transmittance of the liquid crystal element LCE.

For the purpose of facilitating understanding, FIG. 6 assumes that, in the field periods FL1 and FL3, the target gradation value of all the pixels PX is set to a gradation value G2, and in the field periods FL2 and FL4, the target gradation value of all the pixels PX is set to a gradation value G1. The gradation value G2 is smaller than the gradation value G1. Note that the target gradation value is a gradation value determined on the basis of the input image signal DIH, and is a gradation value indicated by the image signal DIL that has not yet been corrected by the correction circuit 136.

In the drawing concerning the liquid crystal response, from the viewpoint of the applied voltage, the reference characters G1 and G2 represent a voltage corresponding to the gradation value G1 and a voltage corresponding to the gradation value G2, respectively. Furthermore, from the viewpoint of the transmittance, the reference characters G1 and G2 represent the transmittance corresponding to the gradation value G1, and the transmittance corresponding to the gradation value G2, respectively. FIG. 6 illustrates the liquid crystal responses of the liquid crystal elements LCE disposed at the first row, the "m/2"-th row, and the m-th row. The factor Ki corresponding to the pixel PX at the first row is set to a value greater than 0 and less than 1. The factor Ki corresponding to the pixel PX at the m-th row is set to a value greater than 1 and less than a predetermined value. Note that, in FIG. 6, the factor Ki corresponding to the pixel PX at the m-th row is set to 1.

For example, at the time T100, a pixel PX at the first row is selected through the first scanning in the field period FL1, and the pixel PX at the first row is supplied with an output image signal VI having a voltage smaller than the voltage corresponding to the targeted gradation value G2. That is, the pixel PX at the first row is supplied with the output image signal VI that has been corrected so that the response velocity of the pixel PX reduces as compared with a case where the voltage corresponding to the gradation value G2 is supplied to the pixel PX. The pixel PX at the first row is supplied with the output image signal VI having a voltage greater than the output image signal VI in a not-illustrated field period FL prior to the time T100, and hence, the transmittance of the liquid crystal element LCE of the pixel PX at the first row increases gradually as compared with the change in the applied voltage. Furthermore, at the time T100, transition from the fourth state Dst to the first state Ast starts at the optical-path shift element 80.

Then, at the time T120, a pixel PX at the "m/2"-th row is selected through the first scanning, and the pixel PX at the "m/2"-th row is supplied with an output image signal VI having a voltage corresponding to the targeted gradation value G2. The pixel PX at the "m/2"-th row is supplied with the output image signal VI having a voltage greater than the output image signal VI in, a not-illustrated field period FL prior to the time T100, and hence, the transmittance of the liquid crystal element LCE of the pixel PX at the "m/2"-th row increases gradually as compared with the change in the applied voltage. Note that, at the time T120, the optical-path shift element 80 is in the middle of transition of states.

At the time T140, a pixel PX at the m-th row is selected through the first scanning, and the pixel PX at the m-th row is supplied with an output image signal VI having a voltage greater than the voltage corresponding to the targeted gradation value G2. That is, the pixel PX at the m-th row is supplied with the output image signal VI that has been corrected so that the response velocity of the pixel PX increases as compared with a case where the voltage corresponding to the gradation value G2 is supplied to the pixel PX. The pixel PX at the m-th row is supplied with the output image signal VI having a voltage greater than the output image signal VI in a not-illustrated field period FL prior to the time T100, and hence, the transmittance of the liquid crystal element LCE of the pixel PX at the m-th row increases gradually as compared with the change in the applied voltage.

Note That, at the time T140, the optical-path shift element 80 is in the middle of transition of states. In addition, the transmittance of the liquid crystal element LCE of the pixel PX at the first row increases to the transmittance that can be regarded as being equivalent to the transmittance corresponding to the output image signal VI. Note that the transmittance of the liquid crystal element LCE of the pixel PX at the "m/2"-th row has not yet reached the transmittance that can be regarded as being equivalent to the transmittance corresponding to the output image signal VI.

During the period T2 from the time T150 to the time T200, the second scanning in the field period FL1 is performed. For example, at the time T150, the pixel PX at the first row is selected through the second scanning, and the pixel PX at the first row is supplied with an output image signal VI having a polarity inverted from the polarity of the output image signal VI in the first scanning. Note that the magnitude of the voltage of the output image signal VI supplied to the pixel PX at the first row through the second scanning is equal to the magnitude of the voltage of the output image signal VI supplied to the pixel PX au the first row through the first scanning. Thus, for example, the transmittance of the liquid crystal element LCE of the pixel PX at the first row increases until it reaches the transmittance corresponding to the output image signal VI. Furthermore, at the time T150, the optical-path shift element 80 ends the transition from the fourth state Dst to the first state Ast. That is, at the time T150, the state of the optical-path shift element 80 is brought in the first state Ast. The state of the optical-path shift element 80 is maintained at the first state Ast until the time T200.

During a period from the time T150 to the time T200 when the state of the optical-path shift element 80 is kept at the first state Ast, the transmittance of the liquid crystal element LCE of the pixel PX at the first row is maintained at the transmittance that can be regarded as being equivalent to the transmittance corresponding to the output image signal VI. That is, the transmittance of the liquid crystal element LCE of the pixel PX at the first row is maintained at the transmittance lower than the transmittance corresponding to the targeted gradation value G2.

In addition, at or around the middle point between the time T150 and the time T200, the transmittance of the liquid crystal element LCE of the pixel PX at the "m/2"-th row reaches the transmittance that can be regarded as being equivalent to the transmittance corresponding to the output image signal VI. That is, at or around the middle point between the time T150 and the time T200, the transmittance of the liquid crystal element LCE of the pixel PX at the "m/2"-th row reaches the transmittance that can be regarded as being equivalent to the transmittance corresponding to the targeted gradation value G2.

Furthermore, even at or around the time T200, the transmittance of the liquid crystal element LCE of the pixel PX at the m-th row has not yet reached the transmittance that can be regarded as being equivalent to the transmittance corresponding to the output image signal VI. However, the voltage of the output image signal VI supplied to the pixel PX at the m-th row is greater than the voltage corresponding to the targeted gradation value G2. Thus, at or around the time T200, the transmittance of the liquid crystal element LCE of the pixel PX at the m-th row has reached the transmittance that can be regarded as being equivalent to the transmittance corresponding to the targeted gradation value G2.

In this manner, in the present embodiment, during a period in which the state of the optical-path shift element 80 is kept at the first state Ast, the average value of the transmittances of the individual pixels PX is distributed among transmittances lower than the transmittance corresponding to the targeted gradation value G2.

Here, a liquid crystal response in a mode in which the multiplier 136a illustrated in FIG. 5 is not provided will be briefly described as a comparative example in the present embodiment. Since the comparative example does not include the multiplier 136a, the data Dod determined through the overdrive process is added to the image signal DIL without any correction. Thus, during a period in which the state of the optical-path shift element 80 is kept at the first state Ast, the transmittance of the liquid crystal element LCE of the pixel PX at the first row is kept at the transmittance that can be regarded as being equivalent to the transmittance corresponding to the targeted gradation value G2. Thus, in the comparative example, the average value of the transmittances of individual pixels PX at the first row increases in a period in which the state of the optical-path shift element 80 is kept at the first state Ast, as compared with the present embodiment.

Furthermore, in the comparative example, the voltage of the output image signal VI supplied to the pixel PX at the m-th row is a voltage corresponding to the targeted gradation value G2. Thus, the transmittance corresponding to the output image signal VI is transmittance corresponding to the targeted gradation value G2. For this reason, in the comparative example, even at or around the time T200, the transmittance of the liquid crystal element LCE of the pixel PX at the m-th row does not reach the transmittance that can be regarded as being equivalent to the transmittance corresponding to the targeted gradation value G2. In addition, in the comparative example, the voltage of the output image signal VI supplied to the pixel PX at the m-th row is small, and hence, the transmittance increases gradually, as compared with the present embodiment. Thus, in the comparative example, the average value of the transmittances of the individual pixels PX at the m-th row is small during a period in which the state of the optical-path shift element 80 is kept at the first state Ast, as compared with the present embodiment.

In this manner, in the comparative example, the average value of the transmittances of the individual pixels PX at the first row is higher, as compared with the present embodiment, and the average value of the transmittances of the individual pixels PX at the m-th row is lower, as compared with the present embodiment. That is, in the comparative example, a difference between the average value of the transmittances of the individual pixels PX at the first row and the average value of the transmittances of the individual pixels PX at the m-th row is large during a period in which the state of the optical-path shift element 80 is kept at the first state Ast, as compared with the present embodiment. In other words, as compared with the comparative example, the present embodiment is able to reduce the difference between the average value of the transmittances of the individual pixel PX at the first row and the average value of the transmittances of the individual pixels PX at the m-th row during a period in which the state of the optical-path shift element 80 is kept at the first state Ast. That is, the present embodiment is able to reduce the variation in the difference between the actual transmittance of the pixels PX and the target transmittance during a period in which the state of the optical-path shift element 80 is kept at the first state Ast, as compared with the comparative example. Thus, the present embodiment is able to suppress a reduction in the quality of the image that a user visually recognizes.

Description will now return to FIG. 6. For example, at the time T200, a pixel PX at the first row is selected through the first scanning in the field period FL2, and the pixel PX at the first row is supplied with an output image signal VI having a voltage greater than the voltage corresponding to the targeted gradation value G1. In this manner, in the present embodiment, the output image signal VI is supplied to the pixel PX at the first row so that the change in the applied voltage to the liquid crystal element LCE reduces, as compared with a case where the voltage corresponding to the targeted gradation value G1 is supplied to the pixel PX at the first row. That is, the pixel PX at the first row is supplied with the output image signal VI that has been corrected so that the response velocity of the pixel PX reduces, as compared with a case where the pixel PX is supplied with the voltage corresponding to the gradation value G1.

The output image signal VI having the voltage smaller than the output image signal VI in the field period FL1 is supplied to the pixel PX at the first row, and hence, the transmittance of the liquid crystal element LCE of the pixel PX at the first row gradually reduces. In addition, at the time T200, the optical-path shift element 80 starts transition from the first state Ast to the second state Bst.

Then, at the time T220, a pixel PX at the "m/2"-th row is selected through the first scanning, and the pixel PX at the "m/2"-th row is supplied with the output image signal VI having a voltage corresponding to the targeted gradation value G1. Since the pixel PX at the "m/2"-th row is supplied with the output image signal VI having a voltage smaller than the output image signal VI in the field period FL1, the transmittance of the liquid crystal element LCE of the pixel PX at the "m/2"-th row reduces gradually as compared with the change in the applied voltage. Note that, at the time T220, the optical-path shift element 80 is in the middle of transition of the states.

At the time T240, a pixel PX at the m-th row is selected through the first scanning, and the pixel PX at the m-th row is supplied with an output image signal VI having a voltage smaller than the voltage corresponding to the targeted gradation value G1. In this manner, in the present embodiment, the output image signal VI is supplied to the pixel PX at the m-th row so that the change in the applied voltage to the liquid crystal element LCE increases, as compared with a case where the voltage corresponding to the targeted gradation value G1 is supplied to the pixel PX at the m-th row. That is, the pixel PX at the m-th row is supplied with the output image signal VI that has been corrected so that the response velocity of the pixel PX increases, as compared with a case where the pixel PX is supplied with the voltage corresponding to the gradation value G1.

Since the pixel PX at the m-th row is supplied with the output image signal VI having the voltage smaller than the output image signal VI in the field period FL1, the transmittance of the liquid crystal element LCE of the pixel PX at the m-th row reduces gradually as compared with the change in the applied voltage. Note that, at the time T240, the optical-path shift element 80 is in the middle of transition of the states. In addition, the transmittance of the liquid crystal element LCE of the pixel PX at the first row reduces to the transmittance that can be regarded as being equivalent to the transmittance corresponding to the output image signal VI. Note that the transmittance of the liquid crystal element LCE of the pixel PX at the "m/2"-th row has not yet reached the transmittance that can be regarded as being equivalent to the transmittance corresponding to the output image signal VI.

In the period T2 from the time T250 to the time T300, the second scanning in the field period FL2 is performed. For example, at the time T250, a pixel PX at the first row is selected through the second scanning, and the pixel PX at the first row is supplied with an output image signal VI having a polarity inverted from the polarity of the output image signal VI in the first scanning. Note that the magnitude of the voltage of the output image signal VI supplied to the pixel PX at the first row through the second scanning is equal to the magnitude of the voltage of the output image signal VI supplied to the pixel PX at the first row through the first scanning. Thus, the transmittance of liquid crystal element LCE of the pixel PX at the first row reduces, for example, until it reaches the transmittance corresponding to the output image signal VI. In addition, at the time T250, the optical-path shift element 80 ends the transition from the first state Ast to the second state Bst. That is, at the time T250, the state of the optical-path shift element 80 is brought into the second state Bst. The state of the optical-path shift element 80 is maintained at the second state Bst until the time T300.

During a period from the time T250 to the time T300 in which the state of the optical-path shift element 80 is kept at the second state Bst, the transmittance of the liquid crystal element LCE of the pixel PX at the first row is kept at the transmittance that can be regarded as being equivalent to the transmittance corresponding to the output image signal VI. That is, the transmittance of the liquid crystal element LCE of the pixel PX at the first row is kept at the transmittance greater than the transmittance corresponding to the targeted gradation value G1.

In addition, at or around the middle point between the time T250 and the time T300, the transmittance of the liquid crystal element LCE of a pixel PX at the "m/2"-th row reaches the transmittance that can be regarded as being equivalent to the transmittance corresponding to the output image signal VI. That is, at or around the middle point between the time T250 and the time T300, the transmittance of the liquid crystal element LCE of the pixel PX at the "m/2"-th row reaches the transmittance that can be regarded as being equivalent to the transmittance corresponding to the targeted gradation value G1.

Furthermore, even at or around the time T300, the transmittance of the liquid crystal element LCE of the pixel PX at the m-th row does not reach the transmittance that can be regarded as being equivalent to the transmittance corresponding to the output image signal VI. However, the voltage of the output image signal VI supplied to the pixel PX at the m-th row is smaller than the voltage corresponding to the targeted gradation value G1. Thus, at and around the time T300, the transmittance of the liquid crystal element LCE of the pixel PX at the m-th row has reached the transmittance that can be regarded as being equivalent to the transmittance corresponding to the targeted gradation value G1.

In this manner, in the present embodiment, the average value of transmittances of the individual pixels PX during a period in which the state of the optical-path shift element 80 is kept at the second state Bst is distributed at transmittances greater than the transmittance corresponding to the targeted gradation value G1. With this configuration, a difference between the average value of transmittances of the individual pixels PX at the first row and the average value of transmittances of the individual pixels PX at the m-th row is reduce, as in a period in which the state of the optical-path shift element 80 is kept at the second state Bst. Thus, even in a period in which the state of the optical-path shift element 80 is kept at the second state Bst, it is possible to suppress a reduction in the quality of the image that a user visually recognizes.

The operation in the field period FL3 is similar to the operation in the field period FL1, except that the state of the optical-path shift element 80 shifts from the second state Bst to the third state Cst. Furthermore, the operation in the field period FL4 is similar to the operation in the field period FL2, except that the state of the optical-path shift element 80 shifts from the third state Cst to the fourth state Dst.

In this manner, the gradation value of the output image signal VI supplied to the pixel PX at the first row in the field period FL2 is corrected by the adjustment circuit 130 so as to reduce a difference from the gradation value of the output image signal VI supplied to the pixel PX at the first row in the field period FL1. In addition, the gradation value of the output image signal VI supplied to the pixel PX at the m-th row in the field period FL2 is corrected by the adjustment circuit 130 so as to increase a difference from the gradation value of the output image signal VI supplied to the pixel PX at the m-th row in the field period FL1.

Note that the operation of the control circuit 100 is not limited to the example illustrated in FIG. 6. For example, it is preferable that the timing at which the transition of states of the optical-path shift element 80 starts is the same timing as the timing at which the scanning line SLN at the first row is selected through the first scanning in each of the field periods FL. However, the timing is not particularly limited to this. In addition, it is preferable that the timing at which the transition of states of the optical-path shift element 80 ends is at or after the timing at which the scanning line SLN at the m-th row is selected through the first scanning in each of the field periods FL. However, the timing is not particularly limited to this. Note that, in each of the field periods FL, it is preferable that a period from the start of the maintaining period in which the state of the optical-path shift element 80 is kept at the first state Ast or the like, up to a time when the scanning line SLN at the first row is selected in the next field period FL, is half or more of the maintaining period.

As described above, in the present embodiment, the projector 1 includes the liquid crystal panel 10 including the plurality of pixels PX arrayed therein and configured to emit light from the plurality of pixels PX to display an image, the optical-path shift element 80 configured to change the optical path of light emitted from the plurality of pixels PX, and the image processing circuit 110. In each of the plurality of field periods FL included in one frame period FM for displaying one frame of an input image indicated by the input image signal DIH, the image processing circuit 110 supplies the plurality of pixels PX with the output image signal VI corresponding to the plurality of pixels PX in a predetermined order. The output image signal VI corresponding to the plurality of pixels PX is generated on the basis of the input image signal DIH. In addition, the image processing circuit 110 includes the adjustment circuit 1300 configured to adjust a response velocity of the plurality of pixels PX when the image displayed by the liquid crystal panel 10 is switched, on the basis of an order of supply of the output image signal VI or of a position of a pixel PX at the liquid crystal panel 10.

In this manner, in the present embodiment, it is possible to adjust the response velocity of the plurality of pixels PX on the basis of the order of supply of the output image signal VI or of the position of a pixel PX at the liquid crystal panel 10. With this configuration, in the present embodiment, for example, when an output image signal VI is supplied to a pixel PX at a row and then, an output image signal VI is supplied to a pixel PX at another row, it is possible to reduce the response velocity of the pixel PX at the one row and increase the response velocity of the pixel PX at this another row. Thus, in the present embodiment, for example, it is possible to suppress an increase in the variation in the difference between the actual transmittance of the pixel PX and the target transmittance during a period in which the state of the optical-path shift element 80 does not change. Thus, with the present embodiment, it is possible to suppress a reduction in the quality of an image that a user visually recognizes.

In addition, in the present embodiment, the plurality of pixels PX include an upper pixel PX supplied with the output image signal VI in the first half in the predetermined order, and a lower pixel OX supplied with the output image signal VI in the second half in the predetermined order. The adjustment circuit 130 corrects the gradation value of the output image signal VI supplied to the first pixel in the field period FL2, so as to reduce a difference between the gradation value of the output image signal VI supplied to the upper pixel PX in the field period FL2 and the gradation value of the output image signal VI supplied to the upper pixel PX in the field period FL1. In addition, the adjustment circuit 130 corrects the gradation value of the output image signal VI supplied to the lower pixel PX in the field period FL2, so as to increase a difference between the gradation value of the output image signal VI supplied to the lower pixel PX in the field period FL2 and the gradation value of the output image signal VI supplied to the lower pixel PX in the field period FL1.

In this manner, in the present embodiment, by correcting the gradation value of the output image signal VI, it is possible to reduce the response velocity of the upper pixel PX and increase the response velocity of the lower pixel PX. With this configuration, in the present embodiment, it is possible to suppress an increase in the variation in the difference between the actual transmittance of the pixel PX and the target transmittance daring a period in which the state of the optical-path shift element 80 does not change. Thus, in the present embodiment, it is possible to suppress a reduction in the quality of an image that a user visually recognizes.

In addition, in the present embodiment, the adjustment circuit 130 performs overdrive processing to compensate the response velocity of the pixel PX. Furthermore, the adjustment circuit 130 adjusts, for each of the plurality of pixels PX, the data Dod determined through the overdrive process on the basis of the order of supply of the output image signal VI. In addition, the adjustment circuit 130 generates the output image signal VI on the basis of the data Dml serving as the data Dod after the adjustment. With this configuration, in the present embodiment, it is possible to correct the gradation value of the output image signal VI that is determined through the overdrive process, on the basis of the order of supply of the output image signal VI or the position of the pixel PX at the liquid crystal panel 10. Even in such a case, it is possible to suppress an increase in the variation in the difference between the actual transmittance of a pixel PX and the target transmittance during a period in which the state of the optical-path shift element 80 does not change. This makes it possible to suppress a reduction in the quality of an image that a user visually recognizes.

Furthermore, in the present embodiment, the adjustment circuit 130 causes the data Dml used to generate the output image signal VI supplied to the upper pixel PX to be smaller than the data Dod determined through the overdrive process. In addition, the adjustment circuit 130 causes the data Dml used to generate the output image signal VI supplied to the lower pixel PX, to be greater than the data Dod determined through the overdrive process. With this configuration, the present embodiment makes it possible to reduce the response velocity of the upper pixel PX and increase the response velocity of the lower pixel PX. Thus, with the present embodiment, it is possible to suppress a reduction in the quality of an image that a user visually recognizes.

2. MODIFICATION EXAMPLE

The individual modes described above can be modified in a various manner. Specific modified modes will be described below as examples. Any given two or more modes selected from the examples described below can be combined together on an at necessary basis as long as they do not contradict each other. Note that, in the following modification examples given as examples, elements having operation and functions equivalent to those in the embodiment are denoted with the same reference characters used in the description above, and detailed description thereof will not be given as appropriate.

First Modification Example

The embodiment described above gives an example in which, in both the period T1 and the period T2, the same magnitude of the voltage of the output image signal VI supplied to each of the pixels PX is given in each of the field periods FL. However, the present disclosure is not limited to such mode. For example, when attention is paid to one pixel PX, the magnitude of the voltage of the output image signal VI supplied to this one pixel PX through the second scanning may be the magnitude differing from the magnitude of the voltage of the output image signal VI supplied to the one pixel PX through the first scanning.

Figure 7:
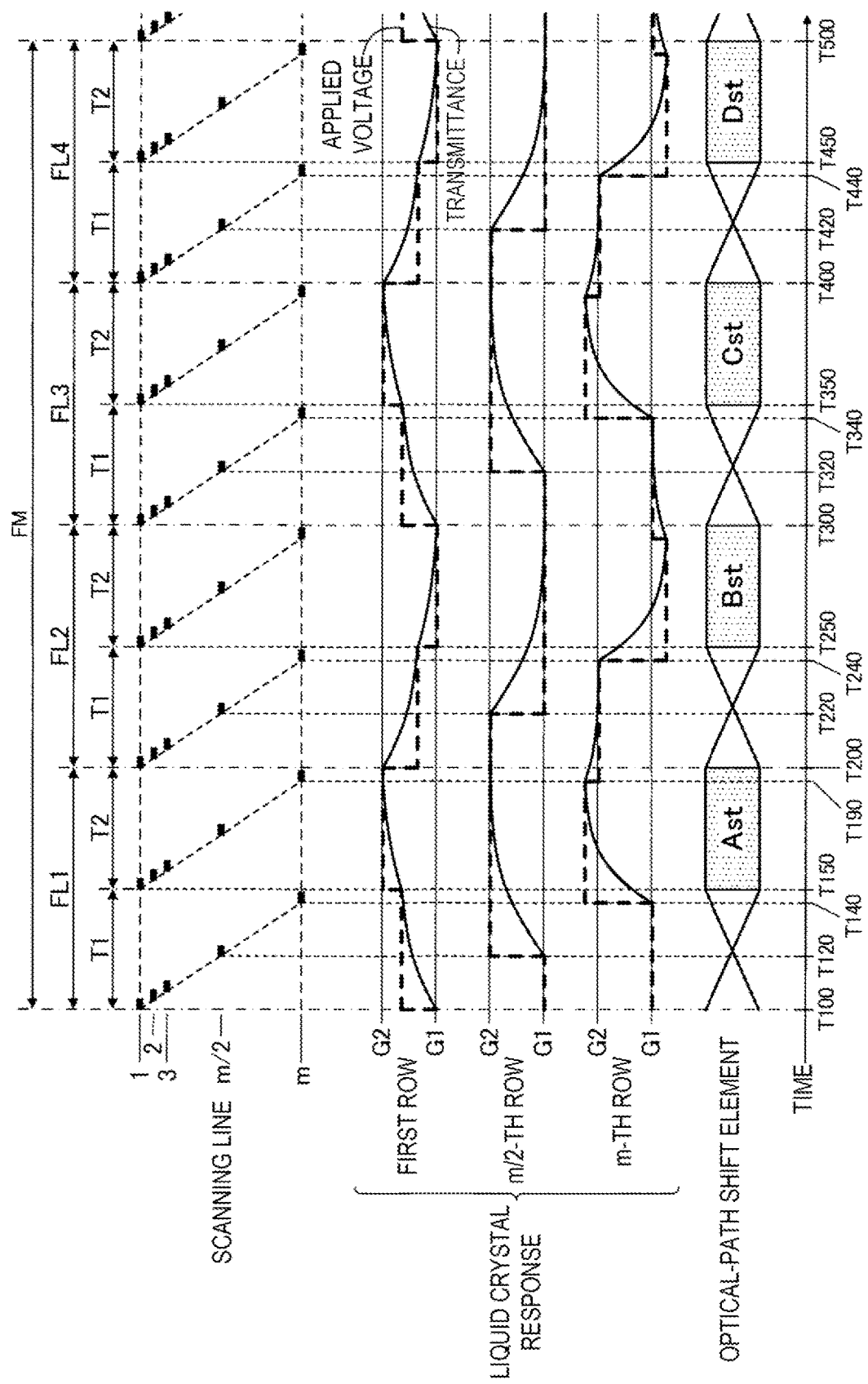
FIG. 7 is a diagram used to explain an operation of a projector according to a first modification example.

FIG. 7 is a diagram used to explain an operation of a projector according to a first modification example. The operation illustrated in FIG. 7 is similar to the operation illustrated in FIG. 6 except than the magnitude of the voltage of the output image signal VI supplied to the individual pixels PX through the second scanning is equal to the voltage cording to the targeted gradation value G1 or G2.

For example, at the time T150, a pixel PX at the first row is selected through the second scanning in the field period FL1, and an output image signal VI having a voltage corresponding to the targeted gradation value G2 is supplied to the pixel PX at the first row. Note that, in the example illustrated in FIG. 7, the magnitude of the voltage of the output image signal VI supplied to the pixel PX at the first row through the first scanning is smaller than the voltage of the output image signal VI illustrated in FIG. 6. Thus, during a period from the first supply of the output image signal VI to the second supply, the response velocity of the pixel PX at the first row is slower than the operation illustrated in FIG. 6. In addition, in the present modification example, at or around the end of the period T2, the transmittance of the liquid crystal element LCE of the pixel PX at the first row reaches the transmittance that can be regarded as being equivalent to the transmittance corresponding to the targeted gradation value G2.

In addition, in the example illustrated in FIG. 7, the magnitude of the voltage of the output image signal VI supplied to the pixel PX at the m-th row through the first scanning is greater than the voltage of the output image signal VI illustrated in FIG. 6. This makes the response velocity of the pixel PX at the m-th row faster than the operation illustrated in FIG. 6 during the period from the first supply of the output image signal VI to the second supply. Thus, in the example illustrated in FIG. 7, at or around the middle point between the time T140 and the time T190, the transmittance of the liquid crystal element LCE of the pixel PX at the m-th row reaches the transmittance corresponding to the targeted gradation value G2.

Furthermore, at the time T190 when the output image signal VI having the voltage corresponding to the targeted gradation value G2 is supplied to the pixel PX at the m-th row, the transmittance of the liquid crystal element LCE of the pixel PX at the m-th row reaches the transmittance greater than the transmittance corresponding to the targeted gradation value G2. Note that, at the time T190, the output image signal VI having a voltage smaller than the output image signal VI at the period T1 is supplied to the pixel PX at the m-th row, and hence, the transmittance of the liquid crystal element LCE of the pixel PX at the m-th row decreases gradually as compared with the change in the applied voltage.

In this manner, in a case of the operation illustrated in FIG. 7, in a period from the first supply of the output image signal VI to the second supply, the pixel PX at the first row is supplied with the output image signal VI that has been corrected so that the response velocity of the pixel PX reduces, as compared with the operation illustrated in FIG. 6. In addition, in a case of the operation illustrated in FIG. 7, in a period from the first supply of the output image signal VI to the second supply, the pixel PX at the n-th row is supplied with the output image signal VI that has been corrected so that the response velocity of the pixel PX increases as compared with the operation illustrated in FIG. 6.

Note that the operation of the present modification example is not limited to the example illustrated in FIG. 7. For example, the magnitude of the voltage of the output image signal VI supplied to each of the pixels PX through the first scanning may be equal to the voltage of the output image signal VI illustrated in FIG. 6.

In this manner, in the present modification example, the adjustment circuit 130 causes the data Dml used to generate the output image signal VI supplied to the upper pixel PX in the period T1 to be smaller than the data Dod determined through the overdrive process. In addition, the adjustment circuit 130 causes the data Dml used to generate the output image signal VI supplied to the lower pixel PX in the period T1 to be greater than the data Dod determined through the overdrive process. Furthermore, the adjustment circuit 130 does not change the data Dml used to generate the output image signal VI supplied to the upper pixel PX in the period T2 nor the data Dml used to generate the output image signal VI supplied to the lower pixel PX in the period T2, from the data Dod determined through the overdrive process. That is, in the period T2, the factor Ki is set to "1" for all the rows. As described above, in the present modification example, it is possible to obtain an effect similar to that of the embodiment described above.

Second Modification Example

The embodiment and the modification example described above give an example in which the data Dod determined through the overdrive process is multiplied by the factor Ki to calculate the data Dml for correction. However, the present disclosure is not limited to such a mode. For example, the adjustment circuit 130 may multiply a result of addition of the image signal DIL and the data Dod by a factor similar to the factor Ki to generate the image data DI. Alternatively, the adjustment circuit 130 may multiply the image signal DIL by a factor similar to the factor Ki without performing the overdrive process, to generate the image data DI. As described above, with the present modification example, it is possible to obtain an effect similar to the embodiment described above.

Third Modification Example

The embodiment and the modification examples described above give an example in which the liquid crystal element LCE has a normally black mode. However, the present disclosure is not limited to such a mode. For example, the liquid crystal element LCE may have a normally white mode. In addition, for example, the liquid crystal LC is not limited to the VA-type liquid crystal, and may be a TN-type or IPS-type liquid crystal. The liquid crystal panel 10 is not limited to a transmissive-type panel, and may be a reflective-type panel. When the liquid crystal panel 10 is a reflective-type panel, it is only necessary to change the transmittance to read the reflectance in the description above. In addition, instead of the liquid crystal panel 10, the projector 1 may be configured as a type using a digital mirror device. In this case, the digital mirror device corresponds to the "electro-optical panel".

Fourth Modification Example

The embodiment and the modification examples described above give an example in which the timing control circuit 140 performs time-division of one frame period FM into a plurality of field periods FL. However, the present disclosure is not limited to such a mode. For example, it may be possible to employ a configuration in which a plurality of constituent elements included in the projector 1, in particular, a plurality of constituent elements included in the control circuit 100 cooperate with each other to perform time-division of one frame period FM into a plurality of field periods FL.

What is claimed is:

1. A projector comprising:
an electro-optical panel including a plurality of pixels;
an optical-path shift element configured to change an optical path of light emitted from the plurality of pixels; and
an image processing circuit configured to supply image signals to the plurality of pixels in a predetermined order in a unit period included in one frame period for displaying one frame of an image indicated by an input image signal, the image signals being generated in response to the input image signal and corresponding to the plurality of pixels, wherein
the image processing circuit includes an adjustment circuit configured to adjust a response velocity of the plurality of pixels at a time of switching the image displayed by the electro-optical panel, based on the order in which the image signals are supplied or positions of the plurality of pixels at the electro-optical panel,
the plurality of pixels include a first pixel and a second pixel, the first pixel being supplied with the image signal in a first half of the order, the second pixel being supplied with the image signal in a second half of the order,
the one frame period includes a first unit period and a second unit period subsequent to the first unit period, and
in the second unit period, the adjustment circuit
corrects a gradation value of the image signal to be supplied to the first pixel to reduce a difference between a gradation value of the image signal to be supplied to the first pixel in the second unit period and a gradation value of the image signal supplied to the first pixel in the first unit period, and
corrects a gradation value of the image signal to be supplied to the second pixel to increase a difference between a gradation value of the image signal to be supplied to the second pixel in the second unit period and a gradation value of the image signal supplied to the second pixel in the first unit period.

2. A projector comprising:
an electro-optical panel including a plurality of pixels;
an optical-path shift element configured to change an optical path of light emitted from the plurality of pixels; and
an image processing circuit configured to supply image signals to the plurality of pixels in a predetermined order in a unit period included in one frame period for displaying one frame of an image indicated by an input image signal, the image signals being generated in response to the input image signal and corresponding to the plurality of pixels, wherein
the image processing circuit includes an adjustment circuit configured to adjust a response velocity of the plurality of pixels at a time of switching the image displayed by the electro-optical panel, based on the order in which the image signals are supplied or positions of the plurality of pixels at the electro-optical panel,
the adjustment circuit
performs overdrive processing of determining, based on a gradation indicated by the image signal, a compensation amount for compensating the response velocity, and
adjusts, based on the order in which the image signals are supplied, for each of the plurality of pixels, the compensation amount determined through the overdriving processing to generate the image signal based on the compensation amount after the adjustment,
the plurality of pixels include a first pixel and a second pixel, the first pixel being supplied with the image signal in a first half of the order, the second pixel being supplied with the image signal in a second half of the order, and
the adjustment circuit
makes the compensation amount used to generate the image signal supplied to the first pixel smaller than the compensation amount determined through the overdrive processing, and
makes the compensation amount used to generate the image signals supplied to the second pixel larger than the compensation amount determined through the overdrive processing.

3. A projector comprising:
an electro-optical panel including a plurality of pixels;
an optical-path shift element configured to change an optical path of light emitted from the plurality of pixels; and
an image processing circuit configured to supply image signals to the plurality of pixels in a predetermined order in a unit period included in one frame period for displaying one frame of an image indicated by an input image signal, the image signals being generated in response to the input image signal and corresponding to the plurality of pixels, wherein
the image processing circuit includes an adjustment circuit configured to adjust a response velocity of the plurality of pixels at a time of switching the image displayed by the electro-optical panel, based on the order in which the image signals are supplied or positions of the plurality of pixels at the electro-optical panel,
the adjustment circuit
performs overdrive processing of determining, based on a gradation indicated by the image signal, a compensation amount for compensating the response velocity, and
adjusts, based on the order in which the image signals are supplied, for each of the plurality of pixels, the compensation amount determined through the overdriving processing to generate the image signal based on the compensation amount after the adjustment,
the plurality of pixels include a first pixel and a second pixel, the first pixel being supplied with the image signals in a first half of the order, the second pixel being supplied with the image signals in a second half of the order,
the unit period includes a first period and a second period subsequent to the first period,
the adjustment circuit
makes the compensation amount used to generate the image signal supplied to the first pixel in the first period smaller than the compensation amount determined through the overdrive processing, and
makes the compensation amount used to generate the image signal supplied to the second pixel in the first period larger than the compensation amount determined through the overdrive processing, and the adjustment circuit does not change the compensation amount used to generate the image signals supplied to the first pixel in the second period and the compensation amount used to generate the image signals supplied to the second pixel in the second period, from the compensation amount determined through the overdrive processing.

* * * * *